Feb. 15, 1938.   V. K. ROBINSON   2,108,077
PIPE JOINT WELDING CLAMP
Filed Dec. 2, 1935   3 Sheets-Sheet 1
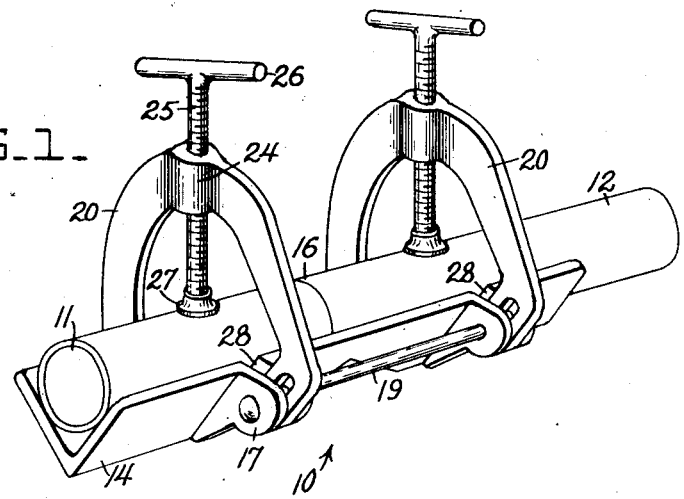
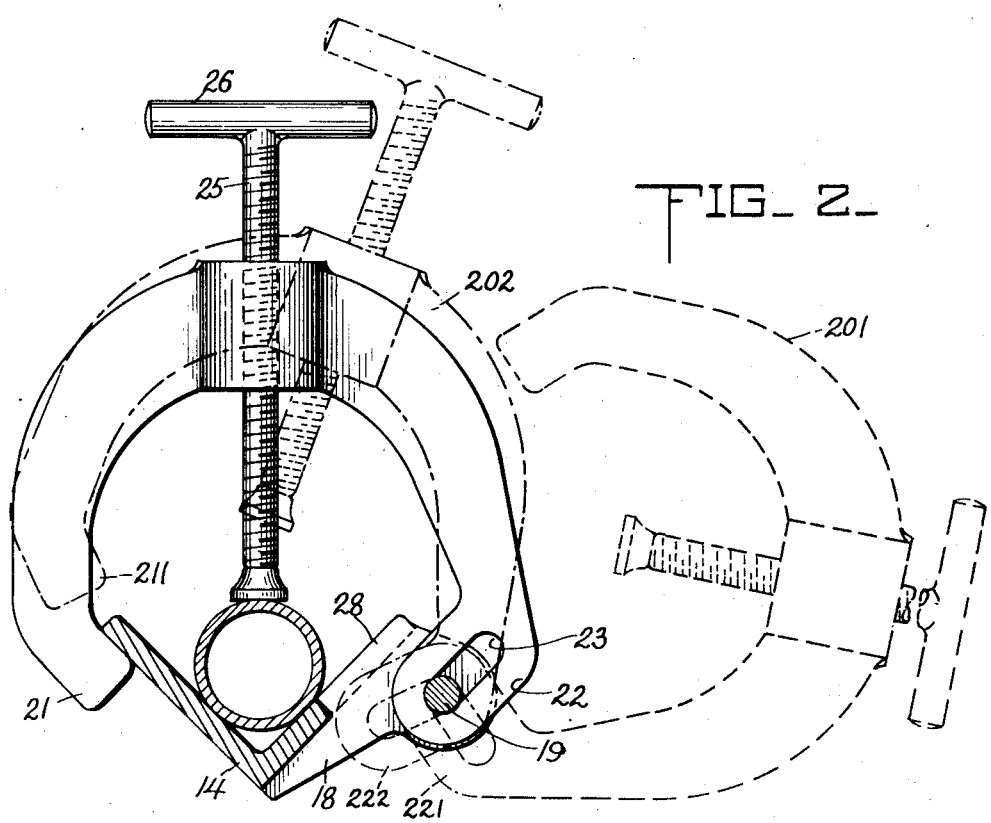
INVENTOR
VAN K. ROBINSON
BY
*Robert A. Lavender*
ATTORNEY Feb. 15, 1938.　　　V. K. ROBINSON　　　2,108,077
PIPE JOINT WELDING CLAMP
Filed Dec. 2, 1935　　　3 Sheets-Sheet 2
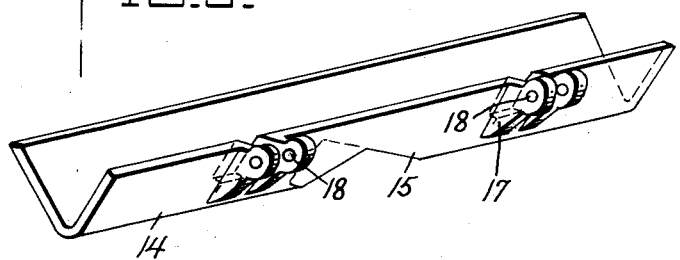
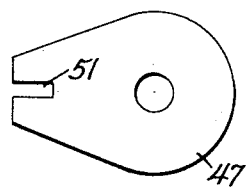
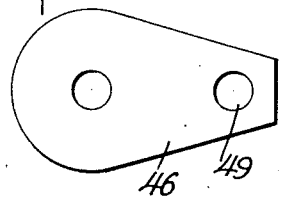
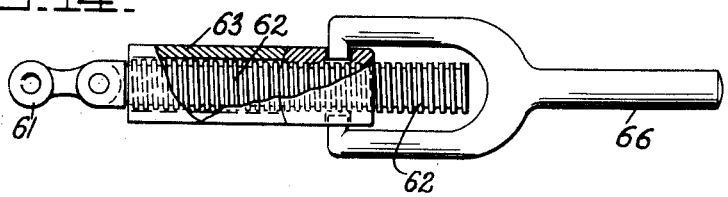
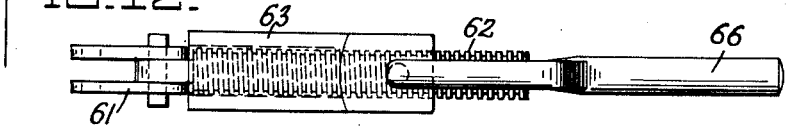
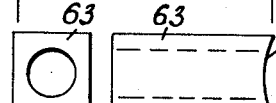
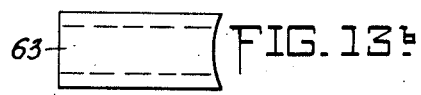
INVENTOR
Van K. Robinson.
BY
ATTORNEY Feb. 15, 1938.  V. K. ROBINSON  2,108,077
PIPE JOINT WELDING CLAMP
Filed Dec. 2, 1935   3 Sheets-Sheet 3
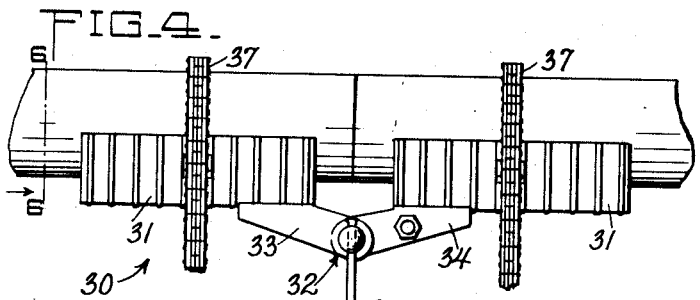
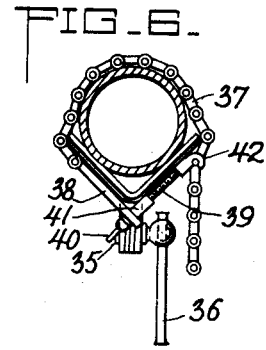
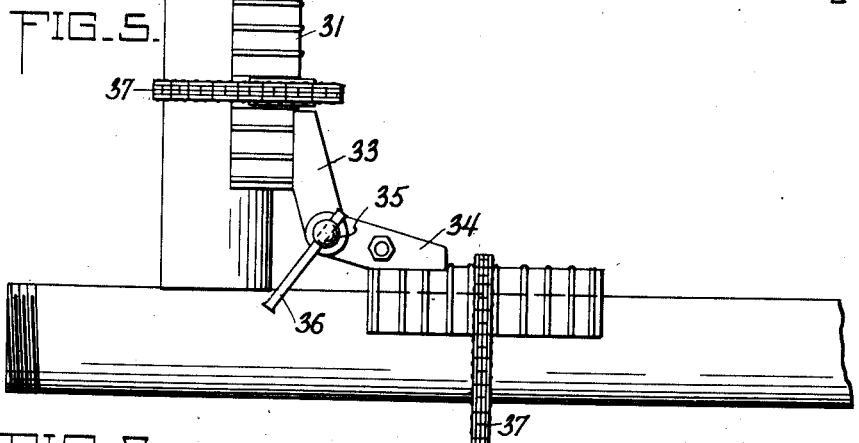
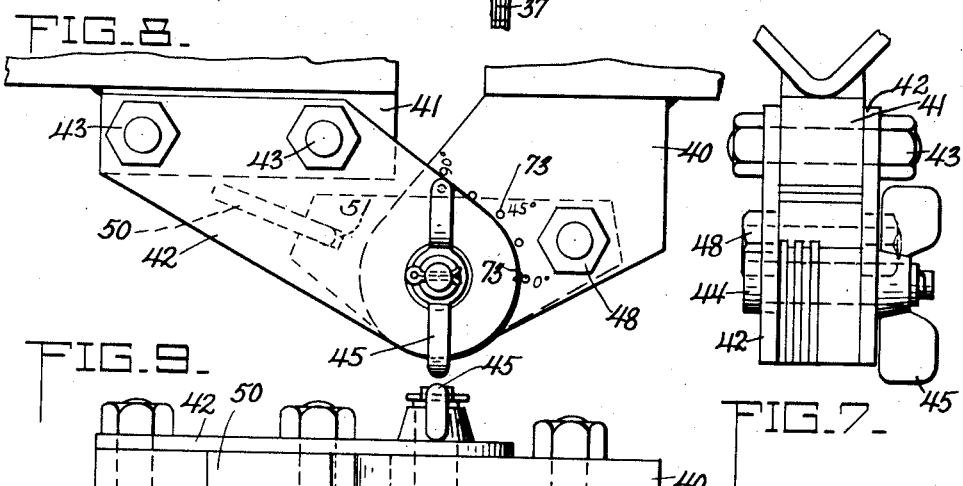
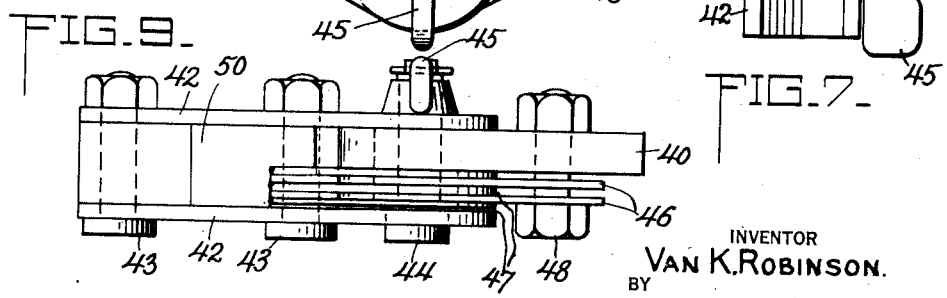
INVENTOR
Van K. Robinson.
BY
Robert A. Lavender
ATTORNEY Patented Feb. 15, 1938

2,108,077

UNITED STATES PATENT OFFICE 2,108,077

PIPE JOINT WELDING CLAMP

Van K. Robinson, Bremerton, Wash.

Application December 2, 1935, Serial No. 52,516

3 Claims. (Cl. 113—102)

(Granted under the act of March 3, 1883, as amended April 30, 1928; 370 O. G. 757)

This invention relates to a pipe joint welding clamp for holding two sections of pipe in adjoining positions while they are being welded together.

It has for an object to provide an improved clamp which may be made in several forms, especially adapted for holding two sections of pipe so that a joint may be welded therebetween. In one form the clamp is particularly intended for holding two sections of pipe in a straight line, allowing the same to be welded together, while in another form the pipe may be held either in a straight line or at any desired angle so that the sections of pipe may be secured together either as a continuous straight section or in a T-joint of any angle.

The widespread present day practice of welding the joints of pipe lines, power plant and other piping, makes it desirable, for economy and quality of workmanship, to have for use in this connection, readily attachable and detachable devices for holding sections of pipe accurately in alignment and position for welding. The cost of the clamps and the number of sizes of pipe usually found make it also economically desirable that the one clamp be adjustable for use on several sizes of pipe. The rough and repeated use of the clamps necessitates a rugged and structurally adequate design but the almost inaccessible location of many joints to be welded makes it desirable that the clamps be light enough to be readily handled. From the standpoint of ease and convenience of handling and low cost of manufacture, the clamps should be of simple design. There are clamps on the market having some of these features; it is an object of this invention to provide clamps incorporating all of these desirable features.

With the above and other objects in view, the invention consists in the construction, combination and arrangement of parts hereinafter set forth and claimed, and illustrated in the drawings, wherein, Fig. 1 is a perspective view of a form of this invention for holding pipes in alignment;

Fig. 2 is a transverse sectional view through the clamp taken at one of the ends;

Fig. 3 is a perspective view of the clamp angle iron means;

Fig. 4 is an elevational view of another form of the angle iron means of this invention suitable for holding pipe sections at desired angles;

Fig. 5 is an elevation of the clamp of Fig. 4 showing the pipe sections held at right angles to each other;

Fig. 6 is a section on line 6—6 of Fig. 4;

Figs. 7, 8 and 9 are enlarged end, side and bottom elevations of another form of hinge on the clamp of this form;

Figs. 10 and 10a are elevational views of the locking plates forming part of the hinge of Figs. 7, 8,and 9;

Fig. 11 is an end view of another form of clamp having a different means for securing the pipe thereto;

Fig. 12 is an elevational detached view of a part of the securing means of Fig. 11;

Figs. 13, 13a and 13b are end, side and bottom elevational views of a sleeve forming part of the securing means of this form; and Fig. 14 is a partly broken-away elevational view taken on the top of Fig. 12.

There is shown at 10 one form of this invention which is used when welding pipe sections, such as at 11 and 12, in alignment with each other. This form 10 of this invention includes an angle iron 14 in which the pipe sections 11 and 12 are to be placed. Along the angle edge of the iron 14, a V-notch 15 is cut, allowing access to the joining line 16 between the pipe sections 11 and 12 so that the welding operation may not be hindered by the presence of the angle iron. In order to immovably secure the pipe sections 11 and 12 into position while the welding operation is being performed, the angle iron is provided with two pairs of aligned, hinge bosses 17 which are apertured as at 18 to permit a hinge pin 19 to pass therethrough. A pair of yokes 20 are provided, one each being secured between each pair of bosses 18 on the hinge pin 19 extending therethrough. The ends of the yokes 20 are turned inwardly at angles as at 21 and 22, the hinge end 22 being provided with a slot 23 for cooperating with the pin 19. The centers of the yokes 20 are enlarged as at 24 and provided with threaded apertures therethrough for cooperating with the clamping bolts 25 provided with T-handles 26 at one end, the other end of bolts 25 being provided with buttons 27 adapted to contact with the pipe sections 11 and 12 and hold them in the angle irons 14. It will be further observed that the angle iron 14 is cut away at 28 between the hinged bosses 18 of each pair.

As a result of such construction, the pipe sections may be placed in position while the yokes 20 are in the dash-line position shown at 201. The yoke is then rotated about the hinge pin 19 to the dot-dash line position 202 while the hinged end 22 moves from the position 221 to the position 222, it being observed that the slot 23 has moved from one end to the other about the pin 19. From the position 202 the yoke may then be moved to the position 20 with the hinged end moving from the position 222 to the position 22. This permits the other end of the yoke to move from the position 211 to the position 21 so that by tightening down the bolt handle 26 the bolt 25 is brought into contact with the pipe section holding it securely in position. With the pipe sections 12 and 11 thus held in position as shown in Fig. 1, the joint line 16 may be securely welded in any conventional manner, the V-notch 15 allowing access to the bottom of the joint line without the necessity of moving the pipe sections in the clamp.

A different form of the invention is shown in Figs. 4 to 10a inclusive. In this form the clamp 30 includes two angle irons 31 secured together at any desired angle by means of a hinge shown generally at 32. These angle irons 31 are provided with heat radiating ribs 72 so that any heat reaching the clamp from the welding operation will be easily dissipated. The hinge 32 includes a leaf 33 secured to and extending from one angle iron, another leaf 34 secured to and extending from the other angle iron and a securing bolt 35 extending through apertures in leaves 33 and 34 and tightened by a slip handle 36, thereby permitting the two angle irons 31 to be held at any desired angle to each other including a straight angle for holding the pipes in alignment as shown at Fig. 4 and at right angles as shown at Fig. 5.

Instead of providing yokes for holding the pipe sections in position on the angle irons, such as is shown in the form in Figs. 1, 2 and 3, wraparound chains 37 may be used. One end of the chain 37 is left free while the other end is secured to a bar 38 through the other end of which is secured a bolt 39 by wing nut 40, the bolt 39 extending through a sleeve 41 for holding the bolt 39 at the desired angle. At the end of the bolt 39 there is provided a hook 42 which may cooperate with any link of the chain 37, thereby enabling the chain 37 to be tightened about the clamp and the pipe section for holding it in position. The yoke type of pipe holding means is preferred for pipe sections of small diameter while the chain type of holding means will preferably be used on pipe sections of large diameter.

In Figs. 7 to 10a, the angle iron hinge is shown as having means at 73 for visually indicating the angle at which it is set. In this form one of the angle irons is provided with an inside plate 40' secured thereto as by welding while the angle iron has a plate 41' welded thereto. A pair of outside hinge plates 42' are secured by means of bolts and nuts 43 to the plate 41'. Clamping bolt 44 and wing nut 45 extend through the outside hinged plates 42' and the inside hinge plate 40' in addition to passing through two stationary friction plates 46 and three movable friction plates 47. A bolt 48 extends through aperture 49 and an aperture in the inside hinge plate 40' while a locking plate 50 is held between the outside hinge plates 42' in the notch 51 in friction plates 47.

In Figs. 11 to 14 a different form of clamping chain is shown. In this form a hook 60 is welded to one side of the angle iron and adapted to cooperate with any link in the chain 61. The other end of the chain 61 has a screw 62 secured thereto of a diameter to fit through a sleeve 63 welded to the bottom of the angle iron 64. A nut 65, provided with a bifurcated pivoted handle 66, may be threaded over the screw 62 and against the spherical edge 67 of the sleeve 63 to tighten the chain about the pipe section in the angle.

The invention described herein may be manufactured and used by or for the Government of the United States of America for governmental purposes without the payment of any royalties thereon or therefor.

I claim:

1. A clamp for securing a plurality of pipe sections in fixed relative position comprising angle iron means provided with angularly disposed contact surfaces adapted to engage a pipe section at points spaced on its periphery and also spaced along the length of the pipe and means for securing the pipe section on the angle iron means comprising a pair of spaced apart yokes having inturned ends, one inturned end of each yoke having a hinge slot therein and a common hinge pin means secured to the side of the angle irons the other inturned end of each yoke being extendible under said angle iron means to abut thereagainst in secured position.

2. A clamp for securing a plurality of pipes in fixed relative position comprising a rigid bar provided with angularly disposed contact sections adapted to engage aligned pipe sections at points spaced on its periphery and also widely spaced along the pipe sections, means for securing the pipe sections to said rigid bar there being a V-notch extending into the bottom of the rigid bar allowing access to the joining line of the pipe sections and a pair of spaced apart yokes having inturned ends adapted to extend under the angle iron means, said yokes including a T-bolt threaded therethrough to abut against the pipe section on the angle iron means.

3. A clamp for securing a plurality of pipes in fixed relative position comprising a rigid bar provided with angularly disposed contact sections adapted to engage aligned pipe sections at points spaced on its periphery and also widely spaced along the pipe sections, means for securing the pipe sections to said rigid bar there being a V-notch extending into the bottom of the rigid bar allowing access to the joining line of the pipe sections, said securing means having a pair of spaced ears on each side of said V-notch, aligned apertures extending through said ears, a common hinge pin extending through said aligned apertures and a pair of spaced apart yokes having inturned ends, said inturned ends being adapted to extend under said rigid bar, one inturned end of each yoke having a hinge slot therein adapted to cooperate with said common hinge pin.

VAN K. ROBINSON.